United States Patent
Jung et al.

(10) Patent No.: US 11,917,596 B2
(45) Date of Patent: Feb. 27, 2024

(54) METHOD AND APPARATUS FOR SUPPORTING MULTIPLE PARTIAL FREQUENCY BANDS IN WIRELESS COMMUNICATION SYSTEM

(71) Applicant: Samsung Electronics Co., Ltd., Suwon-si (KR)

(72) Inventors: Byounghoon Jung, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 428 days.

(21) Appl. No.: 17/309,160

(22) PCT Filed: Oct. 16, 2019

(86) PCT No.: PCT/KR2019/013596
§ 371 (c)(1),
(2) Date: Apr. 30, 2021

(87) PCT Pub. No.: WO2020/091270
PCT Pub. Date: May 7, 2020

(65) Prior Publication Data
US 2022/0007365 A1    Jan. 6, 2022

(30) Foreign Application Priority Data
Nov. 1, 2018 (KR) ........................ 10-2018-0133142

(51) Int. Cl.
*H04W 72/04* (2023.01)
*H04W 72/0453* (2023.01)
(Continued)

(52) U.S. Cl.
CPC ......... *H04W 72/0453* (2013.01); *H04W 8/24* (2013.01); *H04W 24/10* (2013.01); *H04W 72/23* (2023.01); *H04W 74/0808* (2013.01)

(58) Field of Classification Search
CPC .............................. H04W 72/23; H04W 76/27
(Continued)

(56) References Cited

U.S. PATENT DOCUMENTS 10,492,157 B2    11/2019    Nam et al.
2018/0139778 A1    5/2018    Chou et al.
(Continued)

FOREIGN PATENT DOCUMENTS

CN          108683487 A    10/2018
KR    10-2018-0080700 A    7/2018

OTHER PUBLICATIONS

International Search Report of the International Searching Authority dated Jan. 23, 2020 in connection with International Application No. PCT/KR2019/013596, 5 pages.
(Continued)

*Primary Examiner* — Kiet M Doan

(57) ABSTRACT

The disclosure provides a method, performed by a terminal, of performing communication through multiple bandwidth parts (BWPs) in a wireless communication system, the method including: receiving a terminal capability information request from a base station; generating, based on the request, terminal capability information including capability information related to multiple active BWP of the terminal; transmitting the generated terminal capability information to the base station; receiving multiple active BWP configuration information configured based on the capability information related to multiple active BWP of the terminal from the base station; and performing communication with the base station through multiple BWPs activated based on the multiple active BWP configuration information.

14 Claims, 5 Drawing Sheets

(51) Int. Cl.
*H04W 8/24* (2009.01)
*H04W 24/10* (2009.01)
*H04W 72/23* (2023.01)

(58) Field of Classification Search
USPC .................................................. 370/329, 311
See application file for complete search history.

(56) References Cited

U.S. PATENT DOCUMENTS

| 2018/0192383 | A1 | 7/2018 | Nam et al. |
| 2018/0242319 | A1 | 8/2018 | Akkarakaran et al. |
| 2019/0097874 | A1* | 3/2019 | Zhou .................... H04L 5/0023 |
| 2019/0229781 | A1 | 7/2019 | Jin et al. |
| 2021/0007132 | A1* | 1/2021 | Jiang ................. H04W 74/0833 |
| 2021/0057218 | A1* | 2/2021 | Lee ................... H01L 21/67115 |

OTHER PUBLICATIONS

VIVO, Discussion on the support of multiple active BWP, R2-1814271, 3GPP TSG-RAN WG2 Meeting #103bis, Chengdu, China, Oct. 8-12, 2018, 2 pages.
Written Opinion of the International Searching Authority dated Jan. 23, 2020, in connection to International Patent Application No. PCT/KR2019/013596, 16 pages.

* cited by examiner

METHOD AND APPARATUS FOR SUPPORTING MULTIPLE PARTIAL FREQUENCY BANDS IN WIRELESS COMMUNICATION SYSTEM

CROSS-REFERENCE TO RELATED APPLICATIONS

This application is a 371 National Stage of International Application No. PCT/KR2019/013596, filed Oct. 16, 2019, which claims priority to Korean Patent Application No. 10-2018-0133142, filed Nov. 1, 2018, the disclosures of which are herein incorporated by reference in their entirety.

BACKGROUND

1. Field

The disclosure relates to a method and apparatus for transmitting and receiving data by using multiple partial frequency bands in a wireless communication system.

2. Description of Related Art

In order to meet the increasing demand with respect to wireless data traffic after the commercialization of $4^{th}$ generation (4G) communication systems, efforts have been made to develop improved $5^{th}$ generation (5G) communication systems or pre-5G communication systems. For this reason, 5G communication systems or pre-5G communication systems are called 'beyond 4G network communication systems' or 'post long term evolution (LTE) systems'. In order to achieve a high data rate, consideration is given to implementing 5G communication systems in ultra-high frequency bands (millimeter wave (mmW)) (e.g., 60 GHz). In order to reduce the path loss of radio waves and increase a transmission distance of radio waves in ultra-high frequency bands, for 5G communication systems, technologies such as beamforming, massive multiple-input multiple-output (MIMO), full dimensional MIMO (FD-MIMO), array antenna, analog beamforming, and large scale antenna have been discussed. Also, in order to improve networks of systems, in 5G communication systems, development of technologies such as evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation is underway. Furthermore, in 5G communication systems, development of an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter bank multi-carrier (FBMC), non-orthogonal multiple access (NOMA), or sparse code multiple access (SCMA), is underway.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as a sensor network, machine to machine (M2M) communication, or machine-type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Accordingly, various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 5G technology and IoT technology.

In order to achieve a high data rate as considered in this patent, consideration is given to implementing 5G communication systems in ultra-high frequency bands (millimeter wave (mmW)) (e.g., 60 GHz). In order to reduce the path loss of radio waves and increase a transmission distance of radio waves in ultra-high frequency bands, for 5G communication systems, technologies such as beamforming, massive multiple-input multiple-output (MIMO), full dimensional MIMO (FD-MIMO), array antenna, analog beamforming, and large scale antenna have been discussed.

Also, in order to improve networks of systems, in 5G communication systems, development of technologies such as evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation is underway.

Furthermore, in 5G communication systems, development of an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter bank multi carrier (FBMC), non-orthogonal multiple access (NOMA), or sparse code multiple access (SCMA), is underway.

SUMMARY

Disclosed embodiments provide an apparatus and method capable of effectively providing a service in a mobile communication system.

The disclosure provides a system, method, and apparatus by which, in a system including one or more base stations and one or more terminals, a terminal performs data transmission and reception by using multiple partial frequency bands.

The disclosure provides a system, method, and apparatus by which, when there are a terminal and a base station capable of using multiple frequency bands in a next generation wireless mobile communication system, the terminal and the base station are supported to perform data transmission and reception by using one or more partial frequency bands.

According to disclosed embodiments, a service may be effectively provided in a mobile communication system.

DETAILED DESCRIPTION

Figure 1:
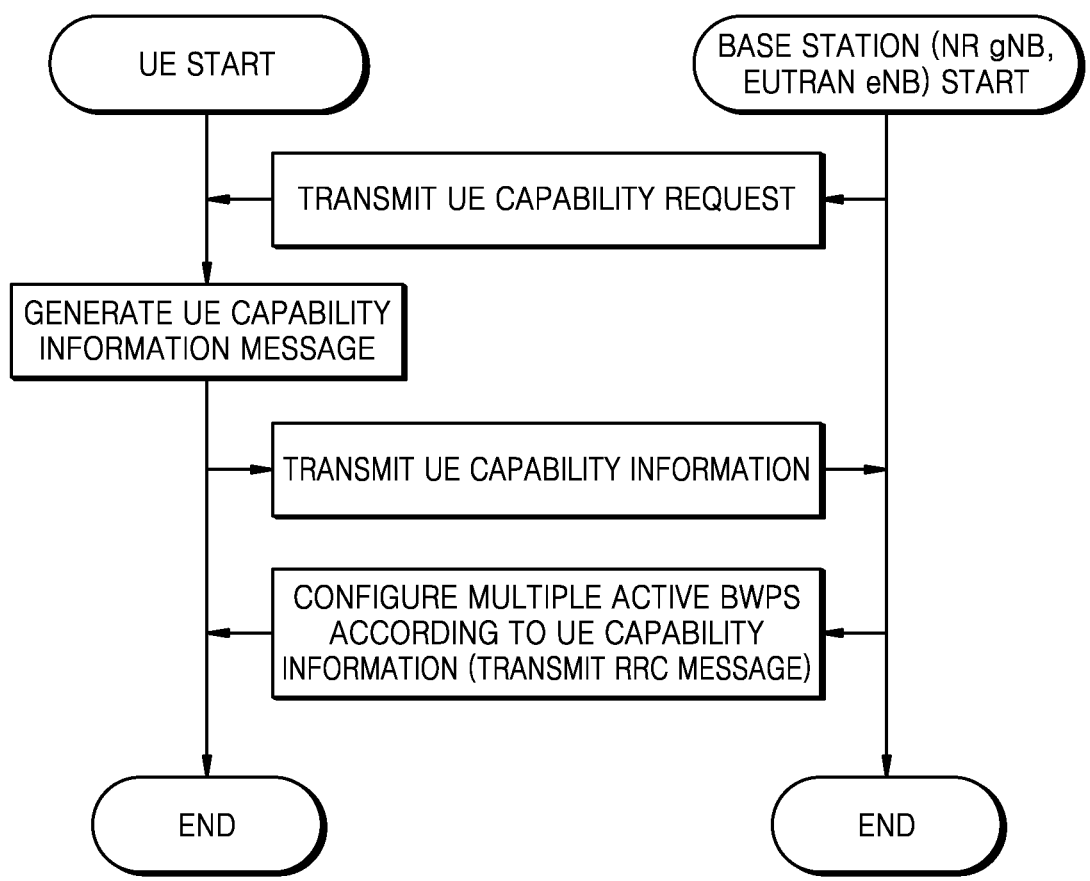
FIG. 1 is a diagram illustrating operations of a user equipment (UE) and a base station, according to embodiments of the disclosure.

According to an embodiment of the disclosure, a method, performed by a terminal, of performing communication through multiple bandwidth parts (BWPs) in a wireless communication system includes: receiving a terminal capability information request from a base station; generating, based on the request, terminal capability information including capability information related to multiple active BWP of the terminal; transmitting the generated terminal capability information to the base station; receiving multiple active BWP configuration information configured based on the capability information related to multiple active BWP of the terminal from the base station; and performing communication with the base station through multiple BWPs activated based on the multiple active BWP configuration information.

The method may further include: receiving measurement reporting configuration information; measuring a channel state at each of multiple BWPs activated based on the measurement reporting configuration information; and reporting the measured channel state of each of the multiple BWPs.

The method may further include: receiving control information for controlling at least some BWPs of the activated BWPs of the terminal, based on the channel state; and controlling the at least some BWPs of the activated BWPs of the terminal, based on at least one of information on an inactive BWP and information on an active BWP included in the received control information.

The information on the inactive BWP may include a to-be-deactivated BWP list or a to-be-deactivated BWP identifier, and the information on the active BWP may include a to-be-activated BWP list and a to-be-activated BWP identifier, wherein the controlling includes controlling activation of a bandwidth on a list basis, based on at least one of the to-be-activated BWP list and the to-be-deactivated BWP list, or controlling activation of each BWP by comparing identifier information of a currently activated BWP with at least one of the to-be-activated BWP identifier and the to-be-deactivated BWP identifier.

The controlling may include deactivating an activated BWP and activating a deactivated BWP by comparing a BWP identifier included in the control information with each of the activated multiple BWPs.

The multiple active BWP configuration information may be received through a radio resource control (RRC) message or a system information block (SIB), wherein the receiving of the multiple active BWP configuration information includes receiving the SIB by selecting a control resource set (CORESET) which the terminal is capable of most quickly attempting to receive from among one or more CORESETs, receiving the SIB by selecting a CORESET determined to have best communication performance, receiving the SIB through all CORESETs, or receiving the SIB transmitted when a listen before talk (LBT) procedure performed by the base station first succeeds.

The performing of the communication may include transmitting and receiving data through a BWP which the terminal is capable of most quickly attempting to receive from among the activated multiple BWPs, performing communication by selecting a BWP having best communication performance, performing communication through all BWPs, or performing communication through a BWP with which a listen before talk (LBT) procedure performed by the base station or the terminal first succeeds.

The method may further include: starting a BWP inactivity timer corresponding to the activated multiple BWPs; and when communication of data transmitted and received through each of the activated multiple BWPs succeeds, starting the BWP inactivity timer, wherein, when the BWP inactivity timer expires, at least one of an operation of stopping using all activated BWPs except an initial BWP and performing a random access procedure through the initial BWP, an operation of performing transition to an idle mode, an operation of performing transition to an inactive mode, a connected discontinuous reception (DRX) (CDRX) operation, a radio link failure (RLF) declaration operation, and a beam failure recovery operation is performed.

According to an embodiment of the disclosure, a method, performed by a base station, of performing communication through multiple bandwidth parts (BWPs) in a wireless communication system includes: transmitting a terminal capability information request to a terminal; receiving terminal capability information including capability information related to multiple active BWP of the terminal in response to the request; transmitting multiple active BWP configuration information for configuring activation of multiple BWPs of the terminal based on the capability information related to multiple active BWP of the terminal; and performing communication with the terminal through multiple BWPs activated based on the multiple active BWP configuration information.

The method may further include: transmitting measurement reporting configuration information; and receiving channel state information of each of the activated multiple BWPs measured based on the measurement reporting configuration information.

The method may further include transmitting control information for controlling at least some BWPs of the activated multiple BWPs of the terminal, based on the channel state information, wherein information on an inactive BWP included in the received control information includes a to-be-deactivated BWP list or a to-be-deactivated BWP identifier, and information on an active BWP included in the received control information includes a to-be-activated BWP list or a to-be-activated BWP identifier.

The control information may be received through a downlink control information (DCI) or radio resource control (RRC) message, wherein the control information includes information for controlling at least one BWP to be always active, wherein the at least one BWP controlled to be always active is an initial BWP.

According to an embodiment of the disclosure, a terminal for performing communication through multiple bandwidth parts (BWPs) includes:

a transceiver; and at least one controller coupled to the transceiver, and configured to receive a terminal capability information request from a base station, generate, based on the request, terminal capability information including capability information related to multiple active BWP of the terminal, transmit the generated terminal capability information to the base station, receive multiple active BWP configuration information configured based on the capability information related to multiple active BWP of the terminal from the base station, and perform communication with the base station through multiple BWPs activated based on the multiple active BWP configuration information.

The at least one controller may be further configured to receive measurement reporting configuration information, measure a channel state at each of multiple BWPs activated based on the measurement reporting configuration information, and report the measured channel state of each of the multiple BWPs.

According to an embodiment of the disclosure, a base station for performing communication through multiple bandwidth parts (BWPs) includes: a transceiver; and at least one controller coupled to the transceiver, and configured to transmit a terminal capability information request to a terminal, receive, in response to the request, terminal capability information including capability information related to multiple active BWP of the terminal, transmit multiple active BWP configuration information for configuring activation of multiple BWPs of the terminal based on the capability information related to multiple active BWP of the terminal, and perform communication with the terminal through multiple BWPs activated based on the multiple active BWP configuration information.

Hereinafter, embodiments of the disclosure will be described in detail with reference to the accompanying drawings. While describing the disclosure, detailed descriptions of related well-known functions or configurations that may blur the points of the disclosure are omitted. The terms used herein are those defined in consideration of functions in the disclosure, but the terms may vary according to the intention of users or operators, precedents, etc. Therefore, the terms used herein have to be defined based on the meaning of the terms together with the description throughout the specification.

The advantages and features of the disclosure and methods of achieving them will become apparent with reference to embodiments of the disclosure described in detail below along with the attached drawings. The disclosure may, however, be embodied in many different forms and should not be construed as limited to embodiments of the disclosure set forth herein; rather these embodiments of the disclosure are provided so that this disclosure will be thorough and complete, and will fully convey the scope of the disclosure to one of ordinary skill in the art, and the scope of the disclosure is defined only by the accompanying claims. In the specification, the same reference numerals denote the same elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). Because these computer program instructions may also be stored in a computer-executable or computer-readable memory that may direct a computer or other programmable data processing apparatus to function in a particular manner, the instructions stored in the computer-executable or computer-readable memory may produce an article of manufacture including instruction means that implement the functions specified in the flowchart block(s). Because the computer program instructions may also be loaded onto a computer or other programmable data processing apparatus, a series of operational steps may be performed on the computer or other programmable apparatus to produce a computer implemented process, and thus the instructions executed on the computer or other programmable apparatus may provide steps for implementing the functions specified in the flowchart block(s).

Also, each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

The term "~ unit" used in the present embodiment refers to a software or hardware component, such as a field-programmable gate array (FPGA) or an application-specific integrated circuit (ASIC), which performs certain tasks. However, "~ unit" does not mean to be limited to software or hardware. The term "~ unit" may be configured to be in an addressable storage medium or configured to operate one or more processors. Thus, "~ unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~ units" may be combined into fewer components and "~ units" or further separated into additional components and "~ units". Further, components and "~ units" may be implemented to operate one or more central processing units (CPUs) in a device or a secure multimedia card. Also, a unit in an embodiment may include one or more processors.

While describing the disclosure, detailed descriptions of related well-known functions or configurations that may blur the points of the disclosure are omitted. Hereinafter, an embodiment of the disclosure will be described with reference to the drawings.

Hereinafter, terms indicating a connection node, terms indicating network entities, terms indicating messages, terms indicating an interface between network entities, and terms indicating various pieces of identification information used herein are exemplified for convenience of explanation. Accordingly, the disclosure is not limited to the terms described below, but other terms indicating objects having equal technical meanings may be used.

Hereinafter, some terms and names defined in the $3^{rd}$ generation partnership project long term evolution (3GPP LTE) standard may be used for convenience of explanation. However, the disclosure may not be limited to the terms and names, and may also be applied to systems following other standards. In the disclosure, an evolved node B (eNB) may be interchangeably used with a next generation node B (gNB) for convenience of explanation. That is, a base station described as an eNB may refer to a gNB. Also, the term "terminal" may refer to other wireless communication devices as well as mobile phones, NB-IoT devices, and sensors.

Hereinafter, a base station is an entity performing resource allocation for a terminal and may include at least one of a gNode B, an eNode B, a Node B, a base station (BS), a radio access unit, a base station controller, and a node on a network. A terminal may include a user equipment (UE), a mobile station (MS), a cellular phone, a smartphone, a computer, or a multimedia system capable of performing a communication function. However, the disclosure is not limited to the above examples.

In particular, the disclosure may be applied to 3GPP NR (5G mobile communication standard). Also, the disclosure may be applied to intelligent services based on 5G communication technology and Internet of Things (IoT)-related technology (e.g., smart home, smart building, smart city, smart car or connected car, health care, digital education, retail business, security, and safety-related services). In the disclosure, an eNB may be interchangeably used with a gNB for convenience of explanation. That is, a base station described as an eNB may refer to a gNB. Also, the term "terminal" may refer to other wireless communication devices as well as mobile phones, NB-IoT devices, and sensors.

A wireless communication system has developed beyond the initially provided voice-based service into a broadband wireless communication system that provides a high speed and high quality packet data service, using communication standards such as high-speed packet access (HSPA) of $3^{rd}$ generation partnership project (3GPP), long term evolution (LTE) or evolved universal terrestrial radio access (E-UTRA), LTE-advanced (LTE-A), LTE-Pro, high-rate packet data (HRPD) of 3GPP2, ultra-mobile broadband (UMB), and 802.16e of Institute of Electrical and Electronics Engineers (IEEE).

An LTE system, which is a representative example of a broadband wireless communication system, employs an orthogonal frequency division multiplexing (OFDM) scheme for a downlink (DL), and employs a single carrier frequency division multiple access (SC-FDMA) scheme for an uplink (UL). The uplink is a radio link through which a terminal (e.g., a user equipment (UE) or a mobile station (MS)) transmits data or a control signal to a base station (e.g., an eNode B), and the downlink is a radio link through which the base station transmits data or a control signal to the terminal. In the multi-access scheme, time-frequency resources for carrying data or control information are allocated and operated in a manner to prevent overlapping of the resources, i.e., to establish orthogonality between users so as to identify data or control information of each user.

As future communication systems after LTE, 5G communication systems should be able to freely reflect various requirements of users and service providers, and thus services simultaneously satisfying the various requirements should be supported. Services considered for 5G communication systems include enhanced mobile broadband (eMBB), massive machine type communication (mMTC), and ultra-reliable low-latency communication (URLLC).

According to some embodiments, eMBB may aim to provide a higher data rate than a data rate supported by LTE, LTE-A, or LTE-Pro. For example, in a 5G communication system, eMBB should be able to provide a peak data rate of 20 gigabits per second (Gbps) in a downlink and a peak data rate of 10 Gbps in an uplink with respect to one base station. Furthermore, the 5G communication system should be able to provide an increased user-perceived data rate of a terminal while providing the peak data rate. In order to satisfy such requirements, in the 5G communication system, various transmission and reception technologies including a further enhanced MIMO transmission technology must be improved. Furthermore, an LTE system transmits a signal by using a maximum transmission bandwidth of 20 megahertz (MHz) in a frequency band of 2 gigahertz (GHz). In contrast, the 5G communication system transmits a signal by using a frequency bandwidth wider than 20 MHz in a frequency band of 3 to 6 GHz or more, and thus may satisfy the data rate requirements necessary for the 5G communication system.

Furthermore, in the 5G communication system, mMTC is considered to support application services such as Internet of Things (IoT). In order for mMTC to efficiently provide the IoT, access by many terminals within a single cell, coverage improvement of a terminal, an increased battery time, a reduction in the cost of a terminal, etc. may be required. The IoT is attached to various sensors and various devices to provide a communication function, and thus should be able to support many terminals (e.g., 1,000,000 terminals/km$^2$) within a cell. Furthermore, because a terminal supporting mMTC is likely to be located in a shaded area that a cell does not cover such as in the basement of a building, wider coverage than other services provided by the 5G communication system may be required. Because the terminal supporting mMTC should include a cheap terminal and it is difficult to replace a battery of the terminal frequently, a very long battery life time (e.g., 10-15 years) may be required.

Lastly, URLLC is a cellular-based wireless communication service used for mission-critical purposes, and may be used in remote control of robots or machinery, industrial automation, unmanned aerial vehicles, remote health care, emergency alert, etc. Accordingly, communication provided by URLLC may have to provide very low latency (ultra-low latency) and very high reliability (ultra-high reliability). For example, services supporting URLLC should meet an air interface latency of less than 0.5 milliseconds and have a packet error rate of $10^{-5}$ or less. Accordingly, for services supporting URLLC, the 5G system should provide a transmission time interval (TTI) less than that of other services, and a design for broad resource allocation in a frequency band in order to ensure the reliability of a communication link may be required.

Three services considered for the 5G communication system, that is, eMBB, URLLC, and mMTC, may be multiplexed and transmitted in one system. In order to satisfy different requirements of the services, different transmission and reception schemes and transmission/reception parameters may be used for the services. However, the mMTC, URLLC, and eMBB are examples of different service types, and service types to which the disclosure is applied are not limited thereto.

Also, although embodiments of the disclosure will be described based on an LTE, LTE-A, LTE Pro, or 5G (or NR, next generation mobile communication) system, the embodiments of the disclosure may be applied to other communication systems having a similar technical background or channel type. Also, the embodiments of the disclosure may be applied to other communication systems through some modifications without departing from the scope of the disclosure based on a determination by one of ordinary skill in the art.

The disclosure relates to a next generation wireless communication system, and provides a system, method, and apparatus by which, in a system including one or more base stations and one or more terminals, a terminal uses multiple bandwidth parts in order to transmit and receive data in a licensed band or an unlicensed band.

FIG. 1 is a diagram illustrating operations of a user equipment (UE) and a base station, according to some embodiments of the disclosure.

FIG. 1 illustrates a procedure in which a UE transmits UE capability information to a base station and a procedure in which a network configures multiple active bandwidth part (BWP) resources by using the UE capability information, according to some embodiments of the disclosure.

The network (e.g., an NR base station or a 5G unlicensed (NR-unlicensed (NR-U)) base station) may transmit a UECapabilityEnquiry signal for requesting the UE in an RRC CONNECTED state to transmit UE capability information. In response to reception of the UECapabilityEnquiry signal, the UE may generate a UECapabilityInformation signal including various pieces of UE capability information such as the following NR-U related information and may transmit the UECapabilityInformation signal to the base station.

```
UE-NR-Capability ::=              SEQUENCE {
    ue-CategoryDL                     ENUMERATED{FFS}                OPTIONAL,
    ue-CategoryUL                     ENUMERATED{FFS}                OPTIONAL,
    pdcp-Parameters                   PDCP-Parameters,
    rlc-Parameters                    RLC-Parameters,
    mac-Parameters                    MAC-Parameters                 OPTIONAL,
    phyLayerParameters                PhyLayerParameters             OPTIONAL,
    rf-Parameters                     RF-Parameters                  OPTIONAL,
    measParameters                    MeasParameters                 OPTIONAL,
    dc-Parameters                     DC-Parameters                  OPTIONAL,
    sl-Parameters                     SL-Parameters                  OPTIONAL,
    scptm-Parameters                  SCPTM-Parameter                OPTIONAL,
    ce-Parameters                     CE-Parameters                  OPTIONAL,
    interRAT-ParametersWLAN           IRAT-ParametersWLAN,
    laa-Parameters                    LAA-Parameters                 OPTIONAL,
    nru-Parameters                    NRU-Parameters                 OPTIONAL,
    lwa-Parameters                    LWA-Parameters                 OPTIONAL,
    wlan-IW-Parameters                WLAN-IW-Parameters,
    lwip-Parameters                   LWIP-Parameters,
    fdd-Add-UE-NR-Capabilities        UE-NR-CapabilityAddXDD-Mode    OPTIONAL,
    tdd-Add-UE-NR-Capabilities        UE-NR-CapabilityAddXDD-Mode    OPTIONAL,
    multipleactiveBWPs                    ENUMERATED {supported}         OPTIONAL,
    numofactiveBWPs                       INTEGER {0... maxactiveBWPs)   OPTIONAL
}
NRU-Parameters ::=                SEQUENCE {
    crossCarrierSchedulingNRU-DL      ENUMERATED {supported}         OPTIONAL,
    crossCarrierSchedulingNRU-UL      ENUMERATED {supported}         OPTIONAL,
    csi-RS-RRM-MeasurementsNRU        ENUMERATED {supported}         OPTIONAL,
    downlinkNRU                           ENUMERATED {supported}         OPTIONAL,
    uplinkNRU                             ENUMERATED {supported}         OPTIONAL,
    endingDwPTS                           ENUMERATED {supported}         OPTIONAL,
    secondSlotStartingPosition        ENUMERATED {supported}         OPTIONAL,
    twoStepSchedulingTimingInfo       ENUMERATED {FFS}               OPTIONAL,
    uss-BlindDecodingAdjustment       ENUMERATED {supported}         OPTIONAL,
    uss-BlindDecodingReduction        ENUMERATED {supported}         OPTIONAL,
    outOfSequenceGrantHandling        ENUMERATED {supported}         OPTIONAL,
    autonomousUplinkNRU                   ENUMERATED {supported}         OPTIONAL,
    multipleBeamBasedNRU              ENUMERATED {supported}         OPTIONAL,
    2stepRACHNRU                          ENUMERATED {supported}         OPTIONAL,
    multipleRApreamblesTxNRU          ENUMERATED {supported}         OPTIONAL,
    multipieLBTBWPsNRU                    ENUMERATED {supported}         OPTIONAL,
    multipieRARRxNRU                  ENUMERATED {supported}         OPTIONAL,
    numofmultipleRApreamblesTxNRU     Integer {1...FFS}              OPTIONAL,
    numofmultipleLBTBWPsNRU           Integer {1...FFS}              OPTIONAL,
    numofmultipleBWPsforRARRxNRU      Integer {1...FFS}              OPTIONAL,
    supportedBandwidthNRU             SupportedBandwidthNRU          OPTIONAL,
    supportedTxBandwidthNRU           SupportedBandwidthNRU          OPTIONAL,
    supportedRxBandwidthNRU           SupportedBandwidthNRU          OPTIONAL,
    multipleactiveBWPsNRU             ENUMERATED {supported}         OPTIONAL,
    numofactiveBWPsNRU                    INTEGER {0... maxactiveBWPs}   OPTIONAL
}
SupportedBandwidthNRU ::=         CHOICE {
    fr1                               ENUMERATED {FFS, mhz5, mhz10, mhz15, mhz20,
mhz25, mhz30, mhz40, mhz50, mhz60, mhz80, mhz100},
    fr2                               ENUMERATED {FFS, mhz50, mhz100, mhz200, mhz400}
}
```

The UECapabilityInformation signal may include capability information related to multiple active BWP to be supported by the UE. The UE that may simultaneously support one or more multiple active BWPs may generate the UECapabilityInformation signal including a message for configuring whether to support multiple active BWPs in multipleactiveBWPs and configuring a maximum number of BWPs that may be supported in numofactiveBWPs.

The UECapabilityInformation signal may include pieces of NR-U related capability information to be supported by the UE. The UE that may simultaneously support one or more multiple active BWPs in an NR-U environment may generate the UECapabilityInformation signal including a message for configuring whether to support multiple active BWPs in multipleactiveBWPsNRU and configuring a maximum number of BWPs that may be supported in numofactiveBWPsNRU.

The UE may transmit the generated UE capability information signal to the base station. The network may configure multiple active BWPs and RACH resources for the UE by including multiple active BWPs, multiple RA preamble transmissions, and multiple RAR search spaces according to the UE capability information of the UE, and thus, may allow the UE to use the multiple active BWPs and the RACH resources.

The base station may identify whether each UE supports an operation of transmitting and receiving data by using multiple active BWPs (multipleactiveBWPs or multipleactiveBWPsNRU) and, when the UE supports the operation, may determine a maximum number of BWPs to be supported (numofactiveBWPs or numofactiveBWPsNRU) according to the received UE capability information (UECapabilityInformation). By considering the information of the UE, an environment in the network, and other interference and UEs, the network may configure the UE to use multiple BWPs as active BWPs. For this configuration, a radio resource control (RRC) message (RRC connection reconfiguration), a MAC message (MAC control element (CE)), a downlink control information (DCI) message, or the like may be used.

Figure 2:
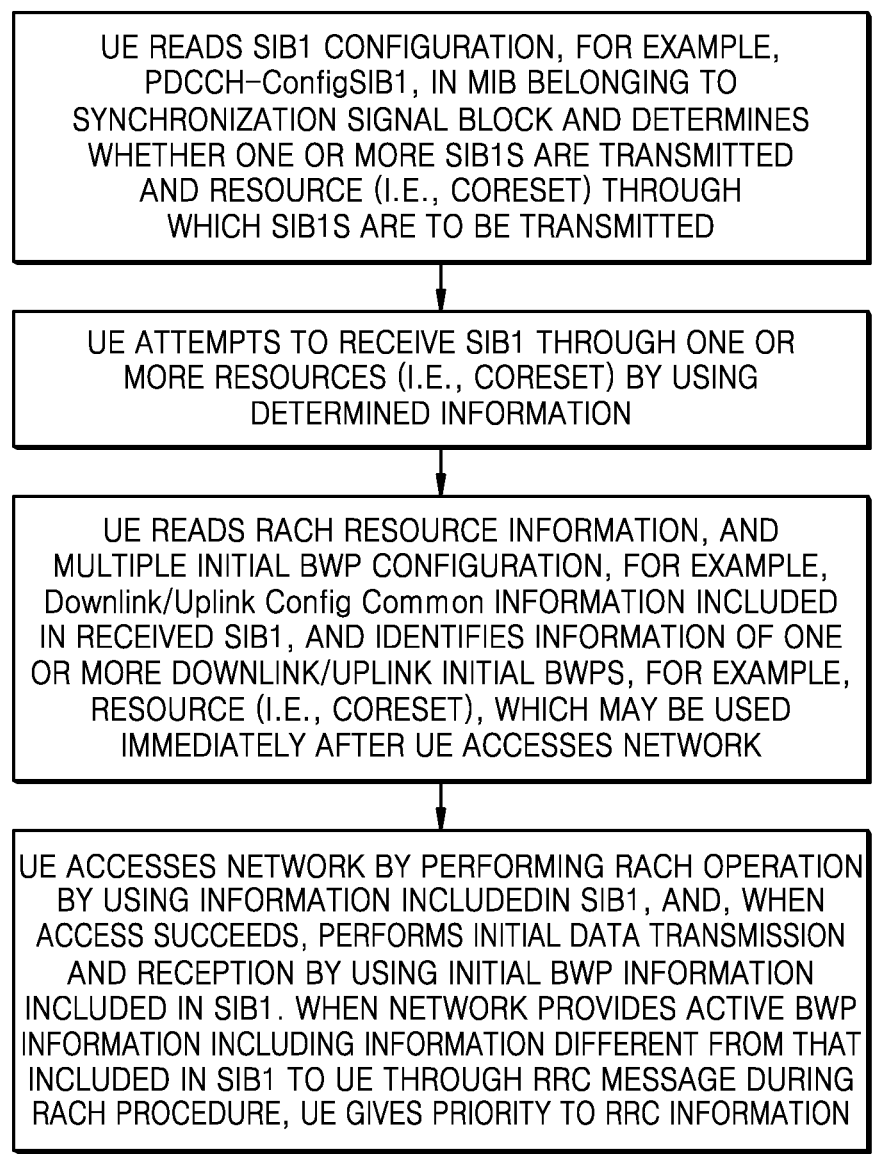
FIG. 2 is a diagram for describing a data transmission and reception operation of a UE, according to embodiments of the disclosure.

FIG. 2 is a diagram for describing a data transmission and reception operation of a UE, according to embodiments of the disclosure.

FIG. 2 illustrates a procedure in which a UE receives master information bits (MIBs), identifies a resource for receiving a system information block 1 (SIB1), and receives the SIB1, according to some embodiments of the disclosure.

The UE may receive system information transmitted by a cell, in order to synchronize with the cell, check cell information, and access the cell. In order to receive the system information, the UE of a next generation wireless communication network may generally receive a synchronization signal, and then may receive an MIB transmitted simultaneously or adjacent to the synchronization signal, and may identify basic information of various networks through the MIB. A configuration of the MIB may be as follows:

```
MIB ::=                    SEQUENCE {
    systemFrameNumber          BIT STRING (SIZE (6)),
    subCarrierSpacingCommon    ENUMERATED {scs15or60,
                                   scs30or120},
    ssb-SubcarrierOffset       NTEGER (0..15),
    dmrs-TypeA-Position        ENUMERATED {pos2, pos3},
    pdcch-ConfigSIB1           SEQUENCE (SIZE
                                   (1..maxPDCCH-ConfigSIB1)) OF
                                   PDCCH-ConfigSIB1,
    cellBarred                 ENUMERATED {barred,
                                   notBarred},
    intraFreqReselection       ENUMERATED {allowed,
                                   notAllowed},
    spare                      BIT STRING (SIZE (1))
}
```

In the MIB, the UE may be configured with a PDCCH resource capable of one or more SIB1s configurable up to maxPDCCH-ConfigSIB1, for example, a control resource set (CORESET) (CORESET #0). When a length of a corresponding sequence is 1, the UE may recognize that the UE is configured with only one resource (i.e., CORESET), and may receive the SIB1 through the resource (i.e., CORESET). when a length of the corresponding sequence is greater than 1, the UE may recognize that the UE is configured with one or more resources (i.e., CORESETs), and may receive the SIB 1 by using one of the following methods through the resources (CORESETs):

1. The UE attempts to receive the SIB 1 by selecting a resource (i.e., CORESET) which the UE is capable of most quickly attempting to receive
2. The UE attempts to receive the SIB 1 by selecting a resource (i.e., CORESET) determined to have the best performance (e.g., transmission success rate, packet error rate (PER), channel occupancy rate, signal-to-interference-plus-noise ratio (SINR), received signal strength indicator (RSSI), reference signal received power (RSRP), reference signal received quality (RSRQ), and channel quality information (CQI), . . . )
3. The UE attempts to receive the SIB1 by selecting all CORESETs (simultaneously when times are the same)
4. In NR-U, the UE may attempt to receive the SIB 1 by using configured multiple resources (i.e., CORESETs) and may receive the SIB 1 transmitted when listen before talk (LBT) performed by the network first succeeds Multiple SIB configuration information may be transmitted as follows, even when the UE connected to the network transmits measured information of an adjacent cell to the base station.

```
CGI-Info ::=               SEQUENCE {
    plmn-IdentityInfoList      PLMN-IdentityInfoList       OPTIONAL,
    frequencyBandList          MultiFrequencyBandListNR    OPTIONAL,
    noSIB1                     SEQUENCE {
        ssb-SubcarrierOffset       INTEGER (0..15),
        PDCCH-ConfigSIB1           SEQUENCE (SIZE
                                       (1..maxPDCCH-ConfigSIB1))
                                       OF PDCCH-ConfigSIB1,
    }                                                      OPTIONAL,
    ...
}
```

Once the UE receives one SIB1, the UE may stop and ignore attempting to receive other SIB1s.

The UE may read RACH resource information, multiple initial BWP configurations, for example, Downlink/Uplink Config Common information, included in the received SIB1, and may identify information of one or more downlink/uplink initial BWPs, for example, a resource (i.e., CORE-SET), which may be used immediately after the UE accesses the network.

As an example of a method by which the UE is configured with one or more initial BWPs, the UE may receive one or more downlink and uplink configurations as follows in a ServingCellConfigCommonSlB message included in the SIB 1.

```
ServingCellConfigCommanSIB ::= SEQUENCE {
    downlinkConfigCommon        SEQUENCE (SIZE (1..maxDLConfigCommonSIB)) OF DownlinkConfigCommonSIB,
    uplinkConfigCommon          SEQUENCE (SIZE (1..maxULConfigCommonSIB)) OF UplinkConfigCommonSIB
OPTIONAL,   -- Need R
    supplementaryUplink         UplinkConfigCommonSIB
OPTIONAL,   -- Need R
    n-TimingAdvanceOffset       ENUMERATED { n0, n25560, n39936 }
OPTIONAL,   -- Need S
    ssb-PositionsInBurst        SEQUENCE {
        inOneGroup              BIT STRING (SIZE (8)),
        groupPresence           BIT STRING (SIZE (8))
OPTIONAL -- Cond Above6GHzOnly
    },
    ssb-PeriodicityServingCell  ENUMERATED {ms5, ms10, ms20, ms 40, ms80, ms160},
    tdd-UL-DL-ConfigurationCommon   TDD-UL-DL-ConfigCommon
OPTIONAL,   -- Cond TDD
    ss-PBCH-BlockPower          INTEGER (-60..50),
    ...
}
```

In another embodiment, the UE may receive one or more BWP information in each Common Config.

```
DownlinkConfigCommonSIB ::=    SEQUENCE {
    frequencyInfoDL            SEQUENCE (SIZE (1..maxDLConfigCommonSIB1)) OF FrequencyInfoDL-SIB,
    initialDownlinkBWP          SEQUENCE (SIZE (1..maxDLConfigCommonSIB2)) OF BWP-DownlinkCommon,
    bcch-Config                SEQUENCE (SIZE (1..maxDLConfigCommonSIB3)) OF BCCH-Config,
    pcch-Config                SEQUENCE (SIZE (1..maxDLConfigCommonSIB4)) OF PCCH-Config,
    ...
}
UplinkConfigCommonSIB ::=      SEQUENCE {
    frequencyInfoUL            SEQUENCE (SIZE (1..maxULConfigCommonSIB1)) OF FrequencyInfoUL-SIB,
    initialUplinkBWP            SEQUENCE (SIZE (1..maxULConfigCommonSIB2)) OF BWP-UplinkCommon,
    timeAlignmentTimerCommon   SEQUENCE (SIZE (1..maxULConfigCommonSIB3)) OF TimeAlignmentTimer
}
```

In another embodiment, the UE may receive an RRC message from the base station and may be configured with and use multiple active BWPs. The base station may transmit the RRC message including information that allows the UE to use the multiple active BWPs to the UE and data transmission and reception may be performed by using BWPs configured in the message.

```
ServingCellConfig ::=              SEQUENCE {
    tdd-UL-DL-ConfigurationDedicated   TDD-UL-DL-ConfigDedicated
OPTIONAL,   -- Cond TDD
    initialDownlinkBWPList                SEQUENCE (SIZE (1..maxNrofDLactiveBWPs1)) OF
BWP-DownlinkDedicated                            OPTIONAL,  -- Need M
    downlinkBWP-ToReleaseList             SEQUENCE (SIZE (1..maxNrofBWPs)) OF BWP-Id
OPTIONAL,   -- Need N
    downlinkBWP-ToAddModList              SEQUENCE (SIZE (1..maxNrofBWPs)) OF BWP-Downlink
OPTIONAL,   -- Need N
    ActiveDownlinkBWPList                 SEQUENCE (SIZE (1..maxNrofDLactiveBWPs2)) OF BWP-Id
OPTIONAL,   -- Cond SyncAndCellAdd
    bwp-InactivityTimer                   ENUMERATED {ms2, ms3, ms4, ms5, ms6, ms8, ms10, ms20, ms30,
                                            ms40,ms50, ms60, ms80,ms100, ms200,ms300, ms500,
                                            ms750, ms1280, ms1920, ms2560, spare10, spare9, spare8,
                                            spare7, spare6, spare5, spare4, spare3, spare2, spare1 }
```

```
OPTIONAL,   --Need R
    defaultDownlinkBWP-Id           BWP-Id
OPTIONAL,   -- Need S
    uplinkConfig                    UplinkConfig
OPTIONAL,   -- Need M
    supplementaryUplink             UplinkConfig
OPTIONAL,   -- Need M
    pdcch-ServingCellConfig         SetupRelease { PDCCH-ServingCellConfig }
OPTIONAL,   -- Need M
    pdsch-ServingCellConfig         SetupRelease { PDSCH-ServingCellConfig }
OPTIONAL,   -- Need M
    csi-MeasConfig                  SetupRelease { CSI-MeasConfig }
OPTIONAL,   -- Need M
    sCellDeactivationTimer              ENUMERATED {ms20, ms40, ms80, ms160, ms200, ms240,
                                            ms320, ms400, ms480, ms520, ms640, ms720,
                                            ms840, ms1280, spare2,spare1}         OPTIONAL,
-- Cond ServingCellWithoutPUCCH
    crossCarrierSchedulingConfig        CrossCarrierSchedulingConfig
OPTIONAL,   -- Need M
    tag-Id                          TAG-Id,
    ue-BeamLockFunction                 ENUMERATED {enabled}
OPTIONAL,   -- Need R
    pathlossReferenceLinking            ENUMERATED {pCell, sCell}
OPTIONAL,   -- Cond SCellOnly
    servingCellMO                   MeasObjectId
OPTIONAL,   -- Cond MeasObject
    ...
}
UplinkConfig ::=                    SEQUENCE {
    initialUplinkBWPList                SEQUENCE (SIZE (1..maxNrofULactiveBWPs1)) WP-UplinkDedicated
OPTIONAL,   -- Need M
    uplinkBWP-ToReleaseList             SEQUENCE (SIZE (1..maxNrofBWPs)) OF BWP-Id
OPTIONAL,   -- Need N
    uplinkBWP-ToAddModList              SEQUENCE (SIZE (1..maxNrofBWPs)) OF BWP-Uplink
OPTIONAL,   -- Need N
    ActiveUplinkBWPList                 SEQUENCE (SIZE (1..maxNrofULactiveBWPs2)) OF BWP-Id
OPTIONAL,   -- Cond SyncAndCellAdd
    pusch-ServingCellConfig         SetupRelease { PUSCH-ServingCellConfig }
OPTIONAL,   -- Need M
    carrierSwitching                SetupRelease { SRS-CarrierSwitching }
OPTIONAL,   -- Need M
    ...
}
```

The UE may be configured with an initial downlink/uplink BWP list from the network. Also, the UE may be configured with an active downlink/uplink BWP list from the network. In this case, maximum values that may be configured in the lists may be the same or different parameters. ActiveDownlinkBWPList (ActiveUplinkBWPList) may indicate first active downlink/uplink BWPs.

When a length of an initial or active BWP list sequence received by the UE is 1, the UE may identify that the UE is configured with only one BWP, and may attempt to perform data transmission/reception through the BWP. When a length of the sequence is greater than 1, the UE may identify that the UE is configured with one or more BWPs, and may attempt to perform data transmission/reception, for example, physical downlink control channel (PDCCH) reception, by using one of the following methods through the BWPs:

1. The UE attempts to perform data transmission/reception by selecting a BWP which the UE is capable of most quickly attempting to receive
2. The UE attempts to perform data transmission/reception by selecting a BWP determined to have the best performance (e.g., transmission success rate, packet error rate (PER), channel occupancy rate, signal-to-interference-plus-noise ratio (SINR), received signal strength indicator (RSSI), reference signal received power (RSRP), reference signal received quality (RSRQ), and channel quality information (CQI) . . . )
3. The UE attempts to perform simultaneous data transmission/reception by selecting all BWPs (simultaneously when times are the same)
4. In NR-unlicensed (U), in the case of a downlink signal, the UE may attempt to perform reception by using configured multiple BWPs, and may receive data transmitted when LBT performed by the network first succeeds. In the case of an uplink signal, the UE may attempt to perform an LBT by using configured multiple BWPs, and may attempt to perform data transmission by using a BWP with which LBT first succeeds.

Also, when the UE receives the active BWP list, the UE may perform an active BWP list changing procedure of discarding all currently active BWP lists and performing information transmission/reception by using the new active BWP list.

Figure 3:
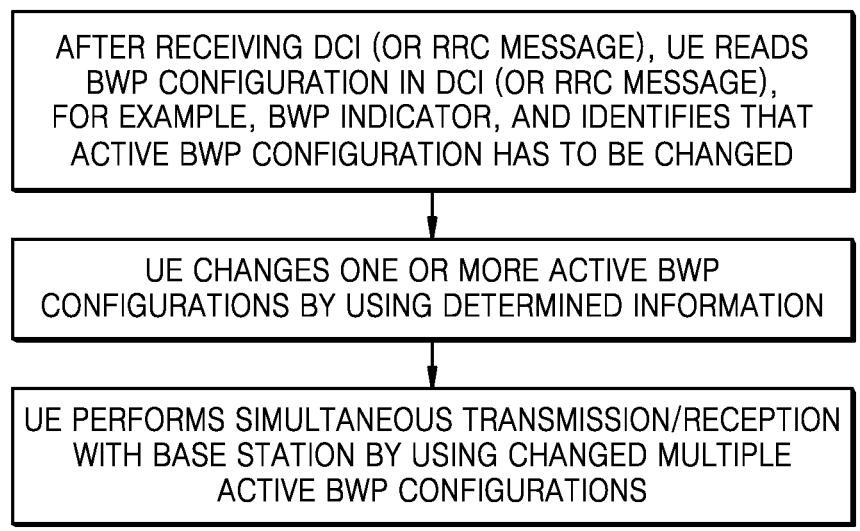
FIG. 3 is a diagram for describing a procedure in which a UE changes an active bandwidth part (BWP) configuration, according to embodiments of the disclosure.

FIG. 3 is a diagram for describing a procedure in which a UE changes an active BWP configuration, according to embodiments of the disclosure.

In detail, FIG. 3 illustrates a procedure in which a UE receives downlink control information (DCI) that is a physical layer signal and changes an active BWP configuration that is currently used, according to an embodiment of the disclosure.

In an embodiment, a base station may transmit all active BWP lists to be changed to the UE as follows. In response to reception of the all active BWP lists, the UE may discard all active BWP lists which the UE currently has, and may perform information transmission/reception by using a new active BWP list.

DCI Format 1_1:

---

The following information is transmitted by means of the DCI format 1_1 with CRC scrambled by C-RNTI or CS-RNTI or MCS-C-RNTI:
- Identifier for DCI formats - 1 bits
  - The value of this bit field is always set to 1, indicating a DL DCI format
- Carrier indicator - 0 or 3 bits as defined in Subclause 10.1 of [5, TS 38.213],
- Bandwidth part indicator list - 0, 1, 2.. or n bits * k as determined by the number of DL BWPs configured by higher layers, excluding the initial DL bandwidth part. The bitwidth for this field is determined as bits, where
  - n denotes the maximum number of bits to indicate the single bandwidth part
  - k denotes the maximum number of UE supported active DL BWPs (included in UE capability)
  - if, in which case the bandwidth part indicator is equivalent to the higher layer parameter BWP-Id;
  - otherwise , in which case the bandwidth part indicator is defined in Table 7.3.1.1.2-1;
If a UE does not support active BWP change via DCI, the UE ignores this bit field.

---

DCI Format 0_1:

---

The following information is transmitted by means of the DCI format 0_1 with CRC scrambled by C-RNTI or CS-RNTI or SP-CSI-RNTI or MCS-C-RNTI:
- Identifier for DCI formats - 1 bit
  - The value of this bit field is always set to 0, indicating an UL DCI format
- Carrier indicator - 0 or 3 bits, as defined in Subclause 10.1 of [5, TS38.213],
- UL/SUL indicator - 0 bit for UEs not configured with SUL in the cell or UEs configured with SUL in the cell but only PUCCH carrier in the cell is configured for PUSCH transmission; 1 bit for UEs configured with SUL in the cell as defined in Table 7.3.1.1.1-1.
- Bandwidth part indicator - 0, 1, 2.. or n bits * k as determined by the number of UL BWPs $n_{BWP, RRC}$ configured by higher layers, excluding the initial UL bandwidth part. The bitwidth for this field is determined as $\lceil \log_2(n_{BWP}) \rceil$ bits, where
  - n denotes the maximum number of bits to indicate the single bandwidth part
  - k denotes the maximum number of UE supported active UL BWPs (included in UE capability)
    - $n_{BWP} = n_{BWP, RRC} + 1$ if $n_{BWP, RRC} \leq 3$, in which case the bandwidth part indicator is equivalent to the higher layer parameter BWP-Id;
    - otherwise $n_{BWP} = n_{BWP, RRC}$, in which case the bandwidth part indicator is defined in Table 7.3.1.1.2-1;
If a UE does not support active BWP change via DCI, the UE ignores this bit field.

---

In an embodiment, the base station may transmit, to the UE, lists of all BWPs to be activated and lists of all active BWPs to be deactivated, as follows. In response to reception of the BWP lists, the UE may deactivate active BWPs included in a to-be-deactivated BWP list included in DCI (delete IDs from the list), and may activate BWPs included in an active BWP list (add IDs to the active BWP list) from among active BWPs which the UE currently has. Next, the UE may perform information transmission/reception by using BWPs included in the active BWP list.

Also, whether to activate or deactivate BWPs may be indicated by including a 1-bit indicator in the list.

DCI Format 1_1:

---

The following information is transmitted by means of the DCI format 1_1 with CRC scrambled by C-RNTI or CS-RNTI or MCS-C-RNTI:
- Identifier for DCI formats - 1 bits
  - The value of this bit field is always set to 1, indicating a DL DCI format
- Carrier indicator - 0 or 3 bits as defined in Subclause 10.1 of [5, TS 38.213],
- Activated Bandwidth part indicator list - 0, 1, 2, ... or n bits * k as determined by the number of DL BWPs configured by higher layers, excluding the initial DL bandwidth part. The bitwidth for this field is determined as bits, including activation indicator 1 bit where
- Deactivated Bandwidth part indicator list - 0, 1, 2, ... or n bits * k as determined by the number of DL BWPs configured by higher layers, excluding the initial DL bandwidth part. The bitwidth for this field is determined as bits, including deactivation indicator 1 bit where
  - n denotes the maximum number of bits to indicate the single bandwidth part
  - k denotes the maximum number of UE supported active DL BWPs (included in UE capability)
  - if, in which case the bandwidth part indicator is equivalent to the higher layer parameter BWP-Id;
  - otherwise , in which case the bandwidth part indicator is defined in Table 7.3.1.1.2-1;
If a UE does not support active BWP change via DCI, the UE ignores this bit field.

---

DCI Format 0_1:

---

The following information is transmitted by means of the DCI format 0_1 with CRC scrambled by C-RNTI or CS-RNTI or SP-CSI-RNTI or MCS-C-RNTI:
- Identifier for DCI formats - 1 bit
  - The value of this bit field is always set to 0, indicating an UL DCI format
- Carrier indicator - 0 or 3 bits, as defined in Subclause 10.1 of [5, TS38.213],
- UL/SUL indicator - 0 bit for UEs not configured with SUL in the cell or UEs configured with SUL in the cell but only PUCCH carrier in the cell is configured for PUSCH transmission; 1 bit for UEs configured with SUL tn the cell as defined in Table 7.3.1.1.1-1,
- Activated Bandwidth part indicator - 0, 1, 2.. or n bits * k as determined by the number of UL BWPs $n_{BWP, RRC}$ configured by higher layers, excluding the initial UL bandwidth part.
- Dectivated Bandwidth part indicator - 0, 1, 2.. or n bits * k as determined by the number of UL BWPs $n_{BWP, RRC}$ configured by higher layers, excluding the initial UL bandwidth part.
  The bitwidth for this field is determined as $\lceil \log_2(n_{BWP}) \rceil$ bits, where
  - n denotes the maximum number of bits to indicate the single bandwidth part
  - k denotes the maximum number of UE supported active UL BWPs (included in UE capability)
    - $n_{BWP} = n_{BWP, RRC} +1$ if $n_{BWP, RRC} \leq 3$, in which case the bandwidth part indicator is equivalent to the higher layer parameter BWP-Id;
    - otherwise $n_{BWP} = n_{BWP, RRC}$, in which case the bandwidth part indicator is defined in Table 7.3.1.1.2-1;
If a UE does not support active BWP change via DCI, the UE ignores this bit field.

---

In an embodiment, the base station may include lists of BWPs to be activated or deactivated in an RRC signal and may transmit the lists to the UE. In response to reception of the BWP lists, the UE may deactivate active BWPs included in a to-be-deactivated BWP list included in the RRC signal (delete IDs from the list), and may activate BWPs included in an active BWP list (add IDs to the active BWP list) from among active BWPs which the UE currently has. Next, the UE may perform information transmission/reception by using BWPs included in the active BWP list.

Also, whether to activate or deactivate BWPs may be indicated by using a 1-bit indicator in the list.

```
ServingCellConfig ::=                       SEQUENCE {
    tdd-UL-DL-ConfigurationDedicated             TDD-UL-DL-ConfigDedicated
OPTIONAL,   -- Cond TDD
    initialDownlinkBWPList                       SEQUENCE (SIZE (1..maxNrofDLactiveBWPs1)) OF
BWP-DownlinkDedicated                                OPTIONAL,   -- Need M
    downlinkBWP-ToReleaseList                    SEQUENCE (SIZE (1..maxNrofBWPs)) OF BWP-Id
OPTIONAL,   -- Need N
    downlinkBWP-ToAddModList                     SEQUENCE (SIZE (1..maxNrofBWPs)) OF BWP-Downlink
OPTIONAL,   -- Need N
    ActivateDownlinkBWPList                      SEQUENCE (SIZE (1..maxNrofDLactiveBWPs2)) OF BWP-Id
OPTIONAL,
    DeactivateDownlinkBWPList                    SEQUENCE (SIZE (1..maxNrofDLactiveBWPs3)) OF BWP-Id
OPTIONAL,
    bwp-InactivityTimer                          ENUMERATED {ms2, ms3, ms4, ms5, ms6, ms8, ms10, ms20, ms30,
                                                     ms 40,ms50, ms60, ms80,ms100, ms200,ms300, ms500,
                                                     ms750, ms1280, ms1920, ms2560, spare10, spare9, spare8,
                                                     spare7, spare6, spare5, spare4, spare3, spare2, spare1 }

OPTIONAL,  --Need R
    defaultDownlinkBWP-Id                        BWP-Id
OPTIONAL,   -- Need S
    uplinkConfig                                 UplinkConfig
OPTIONAL,   -- Need M
    supplementaryUplink                          UplinkConfig
OPTIONAL,   -- Need M
    pdcch-ServingCellConfig                      SetupRelease { PDCCH-ServingCellConfig }
OPTIONAL,   -- Need M
    pdsch-ServingCellConfig                      SetupRelease { PDSCH-ServingCellConfig }
OPTIONAL,   -- Need M
    csi-MeasConfig                              SetupRelease { CSI-MeasConfig }
OPTIONAL,   -- Need M
    sCellDeactivationTimer                       ENUMERATED {ms20, ms40, ms80, ms160, ms200, ms240,
                                                     ms320, ms400, ms480, ms520, ms640, ms720,
                                                     ms840, ms1280, spare2,spare1}          OPTIONAL, -- Cond ServingCellWithoutPUCCH
    crossCarrierSchedulingConfig                 CrossCarrierSchedulingConfig
OPTIONAL,   -- Need M
    tag-Id                                       TAG-Id,
    ue-BeamLockFunction                          ENUMERATED {enabled}
OPTIONAL,   -- Need R
    pathlossReferenceLinking                     ENUMERATED {pCell, sCell}
OPTIONAL,   -- Cond SCellOnly
    servingCellMO                                MeasObjectId
OPTIONAL,   -- Cond MeasObject
    ...
}
UplinkConfig ::=                            SEQUENCE {
    initialUplinkBWPList                         SEQUENCE (SIZE (1..maxNrofULactiveBWPs1)) WP-UplinkDedicated
OPTIONAL,   -- Need M
    uplinkBWP-ToReleaseList                      SEQUENCE (SIZE (1..maxNrofBWPs)) OF BWP-Id
OPTIONAL   -- Need N
    uplinkBWP-ToAddModList                       SEQUENCE (SIZE (1..maxNrofBWPs)) OF BWP-Uplink
OPTIONAL,   -- Need N
    ActivateUplinkBWPList                        SEQUENCE (SIZE (1..maxNrofULactiveBWPs2)) OF BWP-Id
OPTIONAL,
    DeactivateUplinkBWPList                      SEQUENCE (SIZE (1..maxNrofULactiveBWPs3)) OF BWP-Id
OPTIONAL,
    pusch-ServingCellConfig                      SetupRelease { PUSCH-ServingCellConfig }
OPTIONAL,   -- Need M
    carrierSwitching                             SetupRelease { SRS-CarrierSwitching }
OPTIONAL,   -- Need M
    ...
}
```

In an embodiment, the base station may transmit lists of BWPs to be activated or deactivated to the UE as follows. In response to reception of the BWP lists, the UE may compare each BWP ID included in a corresponding list with each BWP in an active BWP list which the UE currently has. The UE may deactivate the BWP ID when the BWP ID is included in the active BWP list which the UE currently has (delete the ID from the list), and may activate the BWP ID when the BWP ID is not included in the active BWP list which the UE currently has (add the ID to the active BWP list). Next, the UE may perform information transmission/reception by using BWPs included in the active BWP list.

DCI Format 1_1:

The following information is transmitted by means of the DCI format 1_1 with CRC scrambled by C-RNTI or CS-RNTI or MCS-C-RNTI:
- Identifier for DCI formats - 1 bits -continued

- The value of this bit field is always set to 1, indicating a DL DCI format
- Carrier indicator - 0 or 3 bits as defined in Subclause 10.1 of [5, TS 38.213],
- Bandwidth part indicator list - 0, 1, 2.. or n bits * k as determined by the number of DL BWPs configured by higher layers, excluding the initial DL bandwidth part. The bitwidth for this field is determined as bits, where
  - n denotes the maximum number of bits to indicate the single bandwidth part
  - k denotes the maximum number of UE supported active DL BWPs (included in UE capability)
  - if, in which case the bandwidth part indicator is equivalent to the higher layer parameter BWP-Id;
  - otherwise, in which case the bandwidth part indicator is defined in Table 7.3.1.1.2-1;

If a UE does not support active BWP change via DCI, the UE ignores this bit field.

For each BWP Id, If the BWP Id indicated by the BWP indicator is one of the current UE active BWP Ids, then UE deactivates the BWP (UE removes the BWP Id from the UE active BWP Id list)

For each BWP Id, If the BWP Id indicated by the BWP indicator is not included in the current UE active BWP Ids, and if the number of current UE active BWP Ids < maximum number of UE active BWPs, then UE activates the BWP (UE includes the BWP Id to the UE active BWP Id list)

DCI Format 0_1:

The following information is transmitted by means of the DCI format 0_1 with CRC scrambled by C-RNTI or CS-RNTI or SP-CSI-RNTI or MCS-C-RNTI:
- Identifier for DCI formats - 1 bit
  - The value of this bit field is always set to 0, indicating an UL DCI format
- Carrier indicator - 0 or 3 bits, as defined in Subclause 10.1 of [5, TS38.213],
- UL/SUL indicator - 0 bit for UEs not configured with SUL in the cell or UEs configured with SUL in the cell but only PUCCH carrier in the cell is configured for PUSCH transmission; 1 bit for UEs configured with SUL in the cell as defined in Table 7.3.1.1.1-1.
- Bandwidth part indicator - 0, 1, 2.. or n bits * k as determined by the number of UL BWPs $n_{BWP, RRC}$ configured by higher layers, excluding the initial UL bandwidth part. The bitwidth for this field is determined as $\lceil \log_2(n_{BWP}) \rceil$ bits, where
  - n denotes the maximum number of bits to indicate the single bandwidth part
  - k denotes the maximum number of UE supported active UL BWPs (included in UE capability)
  - $n_{BWP} = n_{BWP, RRC} + 1$ if $n_{BWP, RRC} \leq 3$, in which case the bandwidth part indicator is equivalent to the higher layer parameter BWP-Id;
  - otherwise $n_{BWP} = n_{BWP, RRC}$, in which case the bandwidth part indicator is defined in Table 7.3.1.1.2-1;

If a UE does not support active BWP change via DCI, the UE ignores this bit field.

For each BWP Id, If the BWP Id indicated by the BWP indicator is one of the current UE active BWP Ids, then UE deactivates the BWP (UE removes the BWP Id from the UE active BWP Id list)

For each BWP Id, If the BWP Id indicated by the BWP indicator is not included in the current UE active BWP Ids, and if the number of current UE active BWP Ids < maximum number of UE active BWPs, then UE activates the BWP (UE includes the BWP Id to the UE active BWP Id list)

In an embodiment, the base station may transmit lists of BWPs to be activated or deactivated to the UE by using an RRC signal as follows. In response to reception of the BWP lists, the UE may compare each BWP ID included in a corresponding list with each BWP in an active BWP list which the UE currently has. The UE may deactivate the BWP ID when the BWP ID is included in the active BWP list which the UE currently has (delete the ID from the list), and may activate the BWP ID when the BWP ID is not included in the active BWP list which the UE currently has (add the ID to the active BWP list). Next, the UE may perform information transmission/reception by using BWPs included in the active BWP list.

Also, whether to activate or deactivate BWPs may be indicated by using a 1-bit indicator in the list.

```
ServingCellConfig ::=                        SEQUENCE {
    tdd-UL-DL-ConfigurationDedicated             TDD-UL-DL-ConfigDedicated
        OPTIONAL,  -- Cond TDD
    initialDownlinkBWPList                       SEQUENCE (SIZE (1..maxNrofDLactiveBWPs1)) OF
    BWP-DownlinkDedicated                            OPTIONAL,  -- Need M
    downlinkBWP-ToReleaseList                    SEQUENCE (SIZE (1..maxNrofBWPs)) OF BWP-Id
        OPTIONAL,  -- Need N
    downlinkBWP-ToAddModList                     SEQUENCE (SIZE (1..maxNrofBWPs)) OF BWP-Downlink
        OPTIONAL,  -- Need N
    ActivateDownlinkBWPList                      SEQUENCE (SIZE (1..maxNrofDLactiveBWPs2)) OF BWP-Id
        OPTIONAL,
    DeactivateDownlinkBWPList                    SEQUENCE (SIZE (1..maxNrofDLactiveBWPs3)) OF BWP-Id
        OPTIONAL,
    bwp-InactivityTimer                          ENUMERATED {ms2, ms3, ms4, ms5, ms6, ms8, ms10, ms20, ms30,
                                                     ms40,ms50, ms60, ms80,ms100, ms200,ms300, ms500,
                                                     ms750, ms1280, ms1920, ms2560, spare10, spare9, spare8,
                                                     spare7, spare6, spare5, spare4, spare3, spare2, spare1 }
        OPTIONAL, --Need R
    defaultDownlinkBWP-Id                        BWP-Id
        OPTIONAL, -- Need S
    uplinkConfig                                 UplinkConfig
        OPTIONAL, -- Need M
    supplementaryUplink                          UplinkConfig
        OPTIONAL, -- Need M
    pdcch-ServingCellConfig                      SetupRelease { PDCCH-ServingCellConfig }
        OPTIONAL, -- Need M
    pdsch-ServingCellConfig                      SetupRelease { PDSCH-ServingCellConfig }
        OPTIONAL, -- Need M
    csi-MeasConfig                               SetupRelease { CSI-MeasConfig }
        OPTIONAL, -- Need M
```

```
        sCellDeactivationTimer                ENUMERATED {ms20, ms40, ms80, ms160, ms200, ms240,
                                                ms320, ms400, ms480, ms520, ms640, ms720,
                                                ms840, ms1280, spare2,spare1}        OPTIONAL,
    -- Cond ServingCellWithoutPUCCH
        crossCarrierSchedulingConfig          CrossCarrierSchedulingConfig
    OPTIONAL,   -- Need M
        tag-Id                                TAG-Id,
        ue-BeamLockFunction                   ENUMERATED {enabled}
    OPTIONAL,   -- Need R
        pathlossReferenceLinking              ENUMERATED {pCell, sCell}
    OPTIONAL,   -- Cond SCellOnly
        servingCellMO                         MeasObjectId
    OPTIONAL,   -- Cond MeasObject
        ...
    }
    UplinkConfig ::=                          SEQUENCE {
        initialUplinkBWPList                      SEQUENCE (SIZE (1..maxNrofULactiveBWPs1)) WP-UplinkDedicated
    OPTIONAL,   -- Need M
        uplinkBWP-ToReleaseList                   SEQUENCE (SIZE (1..maxNrofBWPs)) OF BWP-Id
    OPTIONAL,   -- Need N
        uplinkBWP-ToAddModList                    SEQUENCE (SIZE (1..maxNrofBWPs)) OF BWP-Uplink
    OPTIONAL,   -- Need N
        UpdateUplinkBWPList                       SEQUENCE (SIZE (1..maxNrofULactiveBWPs2)) OF BWP-Id
    OPTIONAL,
        pusch-ServingCellConfig                   SetupRelease { PUSCH-ServingCellConfig }
    OPTIONAL,   -- Need M
        carrierSwitching                          SetupRelease { SRS-CarrierSwitching }
    OPTIONAL,   -- Need M
        ...
    }
```

Figure 4:
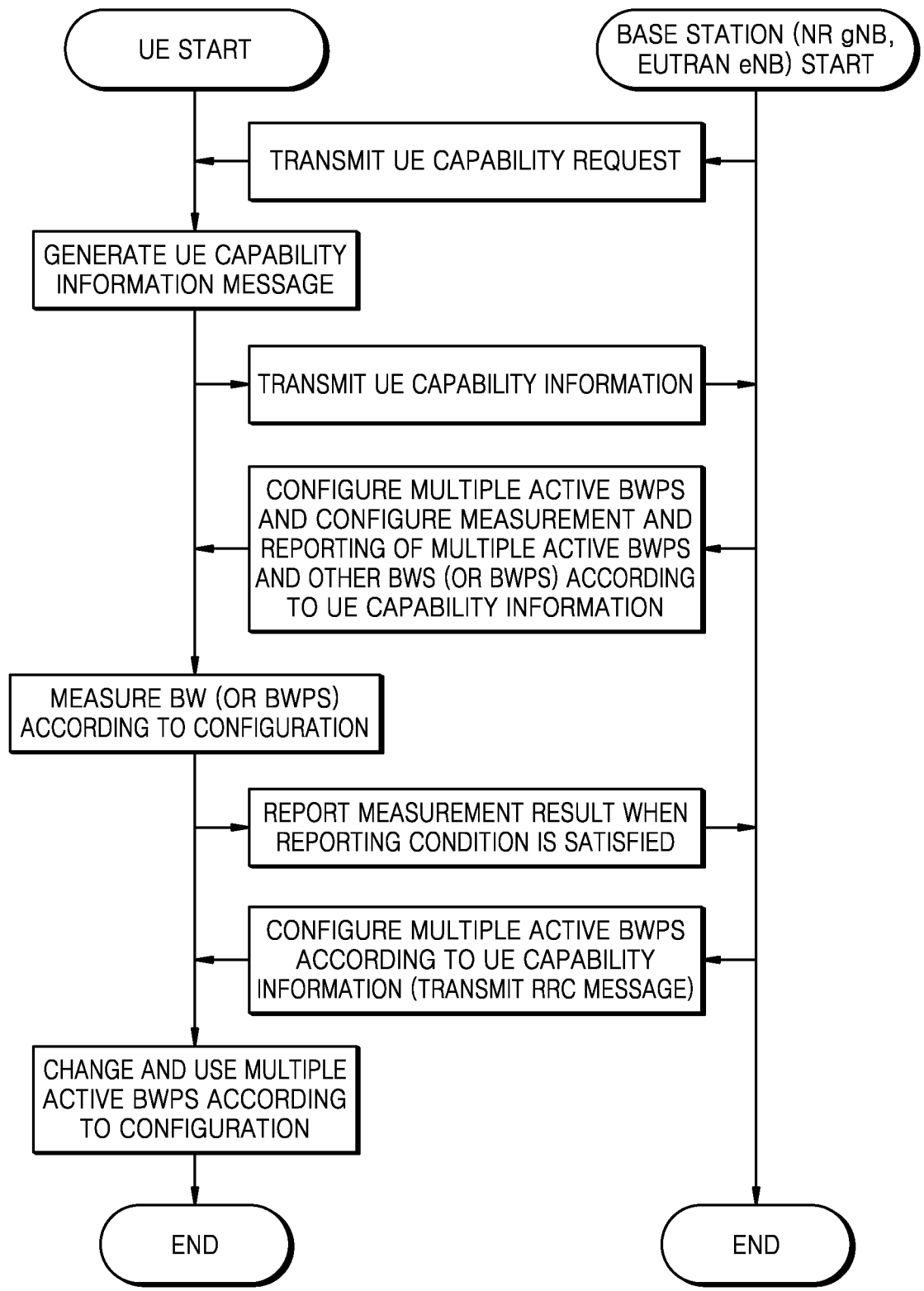
FIG. 4 is a flowchart illustrating a series of procedures in which a UE and a base station configure and change multiple activation BWPs, according to embodiments of the disclosure.

FIG. 4 is a flowchart illustrating a series of procedures in which a UE and a base station configure and change multiple active BWPs, according to embodiments of the disclosure.

The base station may transmit a UECapabilityEnquiry signal for requesting the UE in an RRC CONNECTED state to transmit UE capability information. In response to reception of the UECapabilityEnquiry signal, the UE may generate a UECapabilityInformation signal including various pieces of UE capability information such as multiple active BWP support information and may transmit the UECapabilityInformation signal to the base station.

The base station receiving the UE capability information may transmit, the UE, an RRC message for configuring multiple active BWPs in accordance with capability of the UE and configuring measurement and reporting of the active BWPs and other frequency bands (BWs) and BWPs. Accordingly, the UE may operate at the multiple active BWPs and may measure various frequency bands and BWPs according to configurations and may report a result. For this measurement and reporting, the base station may configure CQI measurement and feedback using a channel state information-reference signal (CSI-RS) in the UE, may configure a measurement object and measurement reporting based on different synchronization signal (SS) frequencies or CSI-RS frequencies for measurement using different synchronization signal blocks (SSBs) or CSI-RSs, or may configure a measurement gap.

The UE configured with the multiple active BWPs and the measurement and reporting may perform communication with a network by using the multiple active BWPs, may measure the multiple active BWPs and other BWs or BWPs according to the measurement configuration, and may perform reporting. For the measurement and reporting, measurement and CQI reporting using a CSI-RS may be used, or measurement using information configured in a measurement object using an SSB or a CSI-RS and periodic or event-based measurement reporting may be used. For this measurement, the base station may configure a measurement gap in the UE. The base station collecting measurement information of different BWs and BWPs from the UE may modify and change the multiple active BWPs of the UE by using a DCI signal or an RRC signal based on the information.

In an embodiment, the base station and the UE may assume that one specific BWP, for example, an initial (DL/UL) BWP marked by BWP-Id=0 is always active. For example, the base station may configure the UE to always include a specific BWP Id as one of the multiple active BWPs. In another embodiment, the base station and the UE may implicitly promise that one specific BWP, for example, an initial (DL/UL) BWP marked by BWP-Id=0 is always included as one of the multiple active BWPs, which may be specified in the standard, may be known, and may be used.

In an embodiment, the base station may configure multiple initial BWPs in the UE, and may allocate different IDs to the initial BWPs. A corresponding ID may be different digits from different pools and general active BWP Ids, or may be the same ID from the same pool but may have a 1-bit indicator indicating an initial BWP attached thereto.

Even when the multiple initial BWPs are used, the base station and the UE may assume that one specific BWP, for example, an initial (DL/UL) BWP marked by initial BWP-Id=0 (or 0, 1 with an initial indicator 1 attached thereto) is always active. For example, the base station may configure the UE to always include a specific BWP Id as one of the multiple active BWPs.

In another embodiment, the base station and the UE may implicitly promise that one specific BWP, for example, an initial (DL/UL) BWP marked by BWP-Id=0 (or 0, 1 with an initial indicator 1 attached thereto) is always included as one of the multiple active BWPs, which may be specified in a standard, may be known, and may be used.

In another embodiment, the base station and the UE may configure at least one initial BWP to be included as some of the multiple active BWPs. This implicit rule may be specified in a standard, may be known by the base station and the UE, and may be used by the base station and the UE.

In an embodiment, the UE may operate one BWP inactivity timer for the multiple active BWPs. In a process by which the UE successfully receives the active BWP configuration and then transmits and receives data by using one or more multiple active BWPs, when certain PDCCH reception targeting the UE is successfully performed through at least one active BWP or other downlink or uplink transmission is successfully transmitted/received, the timer may be re-started.

When the BWP inactivity timer expires without successfully transmitting/receiving downlink or uplink transmission through any active BWP, the UE may perform one of the following operations.

- The UE performs some or all of operations of stopping using all multiple active BWPs that are currently configured, deactivating an active BWP configuration, and emptying an active BWP list, and then moves to an initial (or default) BWP in which a contention-based RACH resource is allocated to the UE to perform an RACH operation. In this case, in the operation of deactivating the active BWP configuration or emptying the active BWP list, a certain BWP, for example, a BWP marked by BWP-Id=0, which is promised by the UE and the base station to be always active may be excluded.
- Transition to idle mode
- Transition to inactive mode
- Connected mode discontinuous reception (DRX) (CDRX) operation start (short or long CDRX)
- Radio link failure (RLF) declaration
- Beam failure recovery operation FIG. 5 is a diagram illustrating a structure of a terminal, according to an embodiment of the disclosure.

Figure 5:
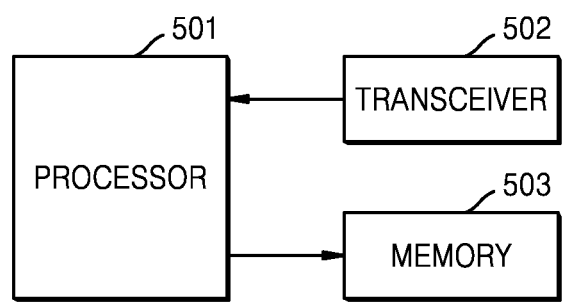
FIG. 5 is a diagram illustrating a structure of a terminal, according to an embodiment of the disclosure.

Referring to FIG. 5, a terminal may include a processor 501, a transceiver 502, and a memory 503. The processor in the disclosure may be defined as a circuit, an application-specific integrated circuit, or at least one processor.

The processor 501 according to an embodiment of the disclosure may control an overall operation of the terminal. For example, the processor 501 may control a signal flow between blocks to perform an operation according to the above flowchart. Also, the processor 501 may write and read data to and from the memory 503. The processor 501 may perform functions of a protocol stack required by a communication standard. To this end, the processor 501 may include at least one processor or micro-processor. Alternatively, the processor 501 may be a part of a processor. Also, a part of the transceiver 502 and the processor 501 may be referred to as a communication processor (CP).

The transceiver 502 according to an embodiment of the disclosure may perform functions for transmitting/receiving a signal via a wireless channel. For example, the transceiver 502 may perform a function of conversion between a bit stream and a baseband signal according to a physical layer standard of a system. For example, during data transmission, the transceiver 502 may generate complex symbols by encoding and modulating a transmission bit stream. Also, during data reception, the transceiver 502 may reconstruct a reception bit stream by demodulating and decoding a baseband signal. Also, the transceiver 502 may up-convert a baseband signal into a radio frequency (RF) band signal and then may transmit the signal through an antenna, and may down-convert an RF band signal received through an antenna into a baseband signal. For example, the transceiver 502 may include a transmission filter, a reception filter, an amplifier, a mixer, an oscillator, a digital-to-analog converter (DAC), and an analog-to-digital converter (ADC). Also, the transceiver 502 may include a plurality of transmission and reception paths. Furthermore, the transceiver 502 may include at least one antenna array including a plurality of antenna elements. When implemented using hardware, the transceiver 502 may include a digital circuit and an analog circuit (e.g., a radio frequency integrated circuit (RFIC)). The digital circuit and the analog circuit may be implemented as one package. Also, the transceiver 502 may include a plurality of RF chains.

The memory 503 according to an embodiment of the disclosure may store data such as a basic program, an application program, and configuration information for an operation of the terminal. The memory 503 may include a volatile memory, a nonvolatile memory, or a combination of a volatile memory and a nonvolatile memory. The memory 503 may provide stored data according to a request of the processor 501. The memory 503 may store at least one of information transmitted and received through the transceiver 502 and information generated through the processor 501.

Figure 6:
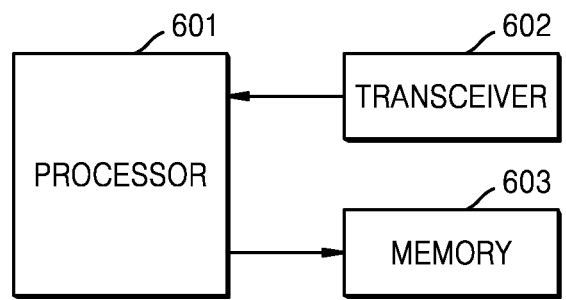
FIG. 6 is a diagram illustrating a structure of a base station, according to an embodiment of the disclosure.

FIG. 6 is a diagram illustrating a structure of a base station, according to an embodiment of the disclosure.

Referring to FIG. 6, a base station may include a processor 601, a transceiver 602, and a memory 603. The processor in the disclosure may be defined as a circuit, an application-specific integrated circuit, or at least one processor.

The processor 601 according to an embodiment of the disclosure may control an overall operation of the base station. For example, the processor 601 may control a signal flow between blocks to perform an operation according to the above flowchart. Also, the processor 601 may write and read data to and from the memory 603. The processor 601 may perform functions of a protocol stack required by a communication standard. To this end, the processor 601 may include at least one processor or micro-processor. Alternatively, the processor 601 may be a part of a processor. Also, a part of the transceiver 602 and the processor 601 may be referred to as a communication processor (CP). According to an embodiment of the disclosure, the processor 601 may control a series of processes so that the base station operates according to an embodiment of the disclosure.

The transceiver 602 according to an embodiment of the disclosure may perform functions for transmitting and receiving a signal via a wireless channel. For example, the transceiver 602 may perform a function of conversion between a bit stream and a baseband signal according to a physical layer standard of a system. For example, during data transmission, the transceiver 602 may generate complex symbols by encoding and modulating a transmission bit stream. Also, during data reception, the transceiver 602 may reconstruct a reception bit stream by demodulating and decoding a baseband signal. Also, the transceiver 602 may up-convert a baseband signal into an RF band signal and then may transmit the signal through an antenna, and may down-convert an RF band signal received through an antenna into a baseband signal. For example, the transceiver 602 may include a transmission filter, a reception filter, an amplifier, a mixer, an oscillator, a DAC, and an ADC. Also, the transceiver 602 may include a plurality of transmission and reception paths. Furthermore, the transceiver 602 may include at least one antenna array including a plurality of antenna elements. When implemented using hardware, the transceiver 602 may include a digital circuit and an analog circuit (e.g., a radio frequency integrated circuit (RFIC)). The digital circuit and the analog circuit may be implemented as one package. Also, the transceiver 602 may include a plurality of RF chains.

The memory 603 according to an embodiment of the disclosure may store data such as a basic program, an application program, and configuration information for an operation of the base station. The memory 603 may include a volatile memory, a nonvolatile memory, or a combination of a volatile memory and a nonvolatile memory. The memory 603 may provide stored data according to a request of the processor 601. The memory 603 may store at least one of information transmitted and received through the transceiver 602 and information generated through the processor 601.

Methods according to the claims of the disclosure or the embodiments described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions for allowing the electronic device to execute the methods according to the claims of the disclosure or the embodiments described in the specification.

These programs (software modules or software) may be stored in a random-access memory (RAM), a non-volatile memory including a flash memory, a read-only memory (ROM), an electrically erasable programmable read only memory (EEPROM), a magnetic disc storage device, a compact disc (CD)-ROM, a digital versatile disc (DVD), another optical storage device, or a magnetic cassette. Alternatively, the programs may be stored in a memory configured by combining some or all of them. Also, each constituent memory may include a plurality of memories.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may connect to a device according to embodiments of the disclosure through an external port. Also, a separate storage device on a communication network may connect to a device according to embodiments of the disclosure.

Several embodiments of the disclosure have been described, but it will be understood that various modifications may be made without departing the scope of the disclosure. Hence, it will be apparent to one of ordinary skill in the art that the disclosure is not limited to the embodiments described, but may encompass not only the appended claims but the equivalents.

The block diagrams as described herein may be construed by one of ordinary skill in the art as conceptual representation of circuitry for implementing the principles of the disclosure. It is also understood by one of ordinary skill in the art that any flow charts, flow diagrams, state transitions, pseudo codes, etc., may be substantially embodied in a computer-readable medium as various processes that may be carried out by a computer or processor, whether explicitly shown or not. Accordingly, the aforementioned embodiments of the disclosure may be written into a program that may be executed by a computer, and may be implemented in a universal digital computer for carrying out the program using a computer-readable recording medium. The computer-readable recording medium includes a storage medium, such as a magnetic storage medium (e.g., a ROM, a floppy disk, or a hard disk) or an optical medium (e.g., a CD-ROM or a DVD).

Functions of the various elements shown in the drawings may be associated with appropriate software and thus provided by the use of dedicated hardware as well as hardware capable of executing the software. When provided by a processor, the functions may be provided by a single dedicated processor, a single shared processor, or a plurality of individual processors, some of which may be shared. Also, the explicit use of the term "processor" or "controller" should not be interpreted as making exclusive reference to hardware capable of executing software, but may be construed as implicitly including, without limitation, a digital signal processor (DSP), a ROM for storing software, a RAM, and a non-volatile storage device.

In the attached claims, an element represented as a means for performing a particular function encompasses any method of performing the particular function, the element being intended to encompass a combination of circuit elements that perform the particular function, or any form of software including firmware, microcode, etc., in combination with circuitry suitable for carrying out the software to perform the particular function.

Throughout the specification, reference to "an embodiment" of principles of the disclosure and various modifications thereof intends that particular properties, structures, features, etc., are included in at least one embodiment of the principle of the disclosure. Thus, the term "an embodiment" and any other modifications thereof do not necessarily refer to the same embodiment of the disclosure.

Throughout the disclosure, the expression "at least one of A or B" indicates only A, only B, and both A and B. Additionally, throughout the disclosure, the expression "at least one of A, B, and C" indicates only A, only B, only C, both A and B, both A and C, both B and C, and all of A, B, and C. Even when more items are enumerated, they may be clearly and expansively interpreted by one of ordinary skill in the art.

The disclosure has been described with reference to the embodiments thereof.

It is to be understood that all embodiments of the disclosure and conditional exemplification as disclosed herein are intended to assist one of ordinary skill in the art in understanding the principles and concepts of the disclosure, and thus one of ordinary skilled in the art may understand that the embodiments of the disclosure may be modified without departing from the substantial characteristics of the disclosure. Therefore, the disclosed embodiments should be considered in an illustrative sense rather than a restrictive sense. The scope of the disclosure is defined only by the following claims, and all the equivalents of the embodiments may also be construed to be in the scope of the disclosure.

The invention claimed is:

1. A method, performed by a terminal, of performing communication through multiple bandwidth parts (BWPs) in a wireless communication system, the method comprising:
 receiving a terminal capability information request from a base station;
 generating, based on the request, terminal capability information comprising capability information related to multiple active BWP of the terminal;
 transmitting the generated terminal capability information to the base station;

receiving multiple active BWP configuration information configured in response to the capability information related to multiple active BWP of the terminal from the base station;

performing communication with the base station through multiple BWPs activated based on the multiple active BWP configuration information, starting a BWP inactivity timer corresponding to the activated multiple BWPs; and in case that communication of data transmitted and received through each of the activated multiple BWPs succeeds, starting the BWP inactivity timer, wherein, in case that the BWP inactivity timer expires, at least one of an operation of stopping using all activated BWPs except an initial BWP and performing a random access procedure through the initial BWP, an operation of performing transition to an idle mode, an operation of performing transition to an inactive mode, a connected discontinuous reception (DRX) (CDRX) operation, a radio link failure (RLF) declaration operation, and a beam failure recovery operation is performed.

2. The method of claim 1, further comprising:
receiving measurement reporting configuration information;
measuring a channel state at each of multiple BWPs activated based on the measurement reporting configuration information; and
reporting the measured channel state of each of the multiple BWPs.

3. The method of claim 2, further comprising:
receiving control information for controlling at least some BWPs of the activated BWPs of the terminal, based on the channel state; and
controlling the at least some BWPs of the activated BWPs of the terminal, based on at least one of information on an inactive BWP and information on an active BWP included in the received control information.

4. The method of claim 3, wherein the information on the inactive BWP comprises a to-be-deactivated BWP list or a to-be-deactivated BWP identifier, and the information on the active BWP comprises a to-be-activated BWP list and a to-be-activated BWP identifier,
wherein the controlling comprises controlling activation of a bandwidth on a list basis, based on at least one of the to-be-activated BWP list and the to-be-deactivated BWP list, or controlling activation of each BWP by comparing identifier information of a currently activated BWP with at least one of the to-be-activated BWP identifier and the to-be-deactivated BWP identifier.

5. The method of claim 3, wherein the controlling comprises deactivating an activated BWP and activating a deactivated BWP by comparing a BWP identifier included in the control information with each of the activated multiple BWPs.

6. The method of claim 1, wherein the multiple active BWP configuration information is received through a radio resource control (RRC) message or a system information block (SIB),
wherein the receiving of the multiple active BWP configuration information comprises receiving the SIB by selecting a control resource set (CORESET) which the terminal is capable of most quickly attempting to receive from among one or more CORESETs, receiving the SIB by selecting a CORESET determined to have best communication performance, receiving the SIB through all CORESETs, or receiving the SIB transmitted in case that a listen before talk (LBT) procedure performed by the base station first succeeds.

7. The method of claim 1, wherein the performing of the communication comprises transmitting and receiving data through a BWP which the terminal is capable of most quickly attempting to receive from among the activated multiple BWPs, performing communication by selecting a BWP having best communication performance, performing communication through all BWPs, or performing communication through a BWP with which a listen before talk (LBT) procedure performed by the base station or the terminal first succeeds.

8. A method, performed by a base station, of performing communication through multiple bandwidth parts (BWPs) in a wireless communication system, the method comprising:
transmitting a terminal capability information request to a terminal;
receiving terminal capability information comprising capability information related to multiple active BWP of the terminal in response to the request;
transmitting multiple active BWP configuration information for configuring activation of multiple BWPs of the terminal based on the capability information related to multiple active BWP of the terminal; and
performing communication with the terminal through multiple BWPs activated based on the multiple active BWP configuration information,
starting a BWP inactivity timer corresponding to the activated multiple BWPs; and
in case that communication of data transmitted and received through each of the activated multiple BWPs succeeds, starting the BWP inactivity timer,
wherein, in case that the BWP inactivity timer expires, at least one of an operation of stopping using all activated BWPs except an initial BWP and performing a random access procedure through the initial BWP, an operation of performing transition to an idle mode, an operation of performing transition to an inactive mode, a connected discontinuous reception (DRX) (CDRX) operation, a radio link failure (RLF) declaration operation, and a beam failure recovery operation is performed.

9. The method of claim 8, further comprising:
transmitting measurement reporting configuration information; and
receiving channel state information of each of the activated multiple BWPs measured based on the measurement reporting configuration information.

10. The method of claim 9, further comprising transmitting control information for controlling at least some BWPs of the activated multiple BWPs of the terminal, based on the channel state information,
wherein information on an inactive BWP included in the transmitted control information comprises a to-be-deactivated BWP list or a to-be-deactivated BWP identifier, and
information on an active BWP included in the transmitted control information comprises a to-be-activated BWP list or a to-be-activated BWP identifier.

11. The method of claim 10, wherein the control information is transmitted through a downlink control information (DCI) or radio resource control (RRC) message,
wherein the control information comprises information for controlling at least one BWP to be always active,
wherein the at least one BWP controlled to be always active is an initial BWP.

12. A terminal for performing communication through multiple bandwidth parts (BWPs), the terminal comprising:
a transceiver; and
at least one controller coupled to the transceiver, and configured to receive a terminal capability information request from a base station, generate, based on the request, terminal capability information comprising capability information related to multiple active BWP of the terminal, transmit the generated terminal capability information to the base station, receive multiple active BWP configuration information configured based on the capability information related to multiple active BWP of the terminal from the base station, and perform communication with the base station through multiple BWPs activated based on the multiple active BWP configuration information, start a BWP inactivity timer corresponding to the activated multiple BWPs, in case that communication of data transmitted and received through each of the activated multiple BWPs succeeds, starting the BWP inactivity timer, wherein, in case that the BWP inactivity timer expires, at least one of an operation of stopping using all activated BWPs except an initial BWP and performing a random access procedure through the initial BWP, an operation of performing transition to an idle mode, an operation of performing transition to an inactive mode, a connected discontinuous reception (DRX) (CDRX) operation, a radio link failure (RLF) declaration operation, and a beam failure recovery operation is performed.

13. The terminal of claim 12, wherein the at least one controller is further configured to receive measurement reporting configuration information, measure a channel state at each of multiple BWPs activated based on the measurement reporting configuration information, and report the measured channel state of each of the multiple BWPs.

14. A base station for performing communication through multiple bandwidth parts (BWPs), the base station comprising:
a transceiver; and
at least one controller coupled to the transceiver, and configured to transmit a terminal capability information request to a terminal, receive, in response to the request, terminal capability information comprising capability information related to multiple active BWP of the terminal, transmit multiple active BWP configuration information for configuring activation of multiple BWPs of the terminal based on the capability information related to multiple active BWP of the terminal, and perform communication with the terminal through multiple BWPs activated based on the multiple active BWP configuration information, start a BWP inactivity timer corresponding to the activated multiple BWPs, in case that communication of data transmitted and received through each of the activated multiple BWPs succeeds, starting the BWP inactivity timer, wherein, in case that the BWP inactivity timer expires, at least one of an operation of stopping using all activated BWPs except an initial BWP and performing a random access procedure through the initial BWP, an operation of performing transition to an idle mode, an operation of performing transition to an inactive mode, a connected discontinuous reception (DRX) (CDRX) operation, a radio link failure (RLF) declaration operation, and a beam failure recovery operation is performed.

* * * * *